(12) United States Patent
Franzini

(10) Patent No.: US 7,258,389 B2
(45) Date of Patent: Aug. 21, 2007

(54) HYDRAULIC SYNCHRONIZATION OF SLIDE-OUT FOR RECREATIONAL VEHICLE

(75) Inventor: John D. Franzini, Brookfield, WI (US)

(73) Assignee: Actuant Corporation, Glendale, WI (US)

(*) Notice: Subject to any disclaimer, the term of this patent is extended or adjusted under 35 U.S.C. 154(b) by 0 days.

(21) Appl. No.: 11/360,369

(22) Filed: Feb. 23, 2006

(65) Prior Publication Data

US 2006/0197358 A1    Sep. 7, 2006

Related U.S. Application Data

(60) Provisional application No. 60/658,679, filed on Mar. 4, 2005.

(51) Int. Cl.
*B60P 1/00* (2006.01)

(52) U.S. Cl. .................. 296/156; 296/26.01; 296/26.13

(58) Field of Classification Search ................ 296/156, 296/165, 171, 172, 175, 176, 26.01, 26.12, 296/26.15

See application file for complete search history.

(56) References Cited

U.S. PATENT DOCUMENTS

| | | | | |
|---|---|---|---|---|
| 3,797,880 A | * | 3/1974 | Pezzaglia | 296/26.13 |
| 5,570,924 A | * | 11/1996 | Few et al. | 296/175 |
| 5,706,612 A | * | 1/1998 | Tillett | 296/171 |
| 5,758,918 A | * | 6/1998 | Schneider et al. | 296/26.13 |
| 5,833,296 A | * | 11/1998 | Schneider | 296/26.13 |
| 6,318,742 B2 | | 11/2001 | Franzini | |
| 6,415,675 B1 | * | 7/2002 | Schneider et al. | 296/26.13 |
| 6,471,275 B1 | * | 10/2002 | Kunz et al. | 296/26.01 |
| 6,536,823 B2 | * | 3/2003 | McManus | 296/26.13 |
| 6,575,514 B2 | * | 6/2003 | McManus et al. | 296/26.01 |
| 6,637,794 B2 | * | 10/2003 | McManus et al. | 296/26.01 |
| 6,696,813 B2 | * | 2/2004 | McManus et al. | 318/700 |
| 2002/0074815 A1 | * | 6/2002 | McManus et al. | 296/26.01 |
| 2005/0179278 A1 | * | 8/2005 | Yoder | 296/26.13 |
| 2007/0063525 A1 | * | 3/2007 | Howells | 296/24.3 |

* cited by examiner

*Primary Examiner*—Kiran B. Patel
(74) *Attorney, Agent, or Firm*—Quarles & Brady LLP

(57) ABSTRACT

A hydraulic synchronization system for a slide-out portion of a recreational vehicle has two cylinders spaced apart and reversed in orientation with respect to one another at opposite sides of the slide-out portion. The bore sides of the cylinders are connected and the rod sides of the cylinders are connected such that fluid is pumped from the rod side of one cylinder to the rod side of the other cylinder and from the bore side of one cylinder to the bore side of the other cylinder upon extension and retraction of the slide-out portion to keep the slide-out portion synchronized.

2 Claims, 6 Drawing Sheets

HYDRAULIC SYNCHRONIZATION OF SLIDE-OUT FOR RECREATIONAL VEHICLE

CROSS-REFERENCE TO RELATED APPLICATION

This application claims benefit to U.S. Provisional Patent Application No. 60/658,679 filed Mar. 4, 2005.

STATEMENT CONCERNING FEDERALLY SPONSORED RESEARCH OR DEVELOPMENT

Not applicable.

FIELD OF THE INVENTION

This invention relates to the field of expandable vehicles, and particularly to synchronization of the movement of a slide-out room of a recreational vehicle.

Slide-out operating mechanisms for moving rooms in and out in recreational vehicles are well known. Such a mechanism may have two telescopic rails spaced apart that are powered in and out to move the room in and out, out to expand the living space of the recreational vehicle, and in to contract it for over-the-road travel. Other mechanism also exist that have cables, or the room is directly driven in and out. In any case, the movement of the two sides of the room must be synchronized to one another, or else the room will become canted, possibly resulting in damage to the vehicle. In a rack and pinion system, synchronization is accomplished by pinions at opposite ends of a shaft meshing with racks on two rails or on the room. In such mechanisms, any of a number of means may be used to power the rails in and out, including an electric motor that drives the pinions, a hydraulic cylinder, a lead screw, cables or linkage mechanisms.

The present invention provides an alternative for synchronizing the movement of a slide-out room.

SUMMARY OF THE INVENTION

Synchronization of the movement of a slide-out room is accomplished using two hydraulic actuators, one on each side of the room. One of the actuators is arranged so as to extend when the room is extended and the other is arranged so as to retract when the room is extended. The bore sides of the cylinders of the two actuators are connected with a hydraulic line and the rod sides of the two cylinders of the actuators are also connected with a hydraulic line. As such, the bore sides exchange fluid with one another and the rod sides exchange fluid with one another, but the bore sides do not exchange fluid with the rod sides. Thus, extension of one cylinder causes an equal and opposite retraction of the other cylinder, and vice versa. Thus, both sides of the slide-out move in and out in synchronization with one another. This system could be applied to the top and bottom of the room as well, to synchronize the top and bottom movement rather than or in addition to the side to side movement.

Such a system is completely passive, in that it needs no power to keep the sides in synchronization with one another. In addition, any means may be used to power the slide-out in and out, including manual power with it just being pushed in and out by a human or cranked in and out if the manual input is a crank or other means. Alternatively, an electric drive could be used using a rack and pinion arrangement or a lead screw, or a hydraulic cylinder could be used, for example a single cylinder mounted between the two synchronization cylinders or elsewhere, or a cable system could be used, a chain system, a different type of mechanical link system or any system for powering the room in and out. Since the hydraulic cylinders are separate from the drive systems and passive, they will always work to keep the two sides of the slide-out in synchronization with one another no matter what type of drive is used or where it is applied to the room.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENTS

Figure 1:
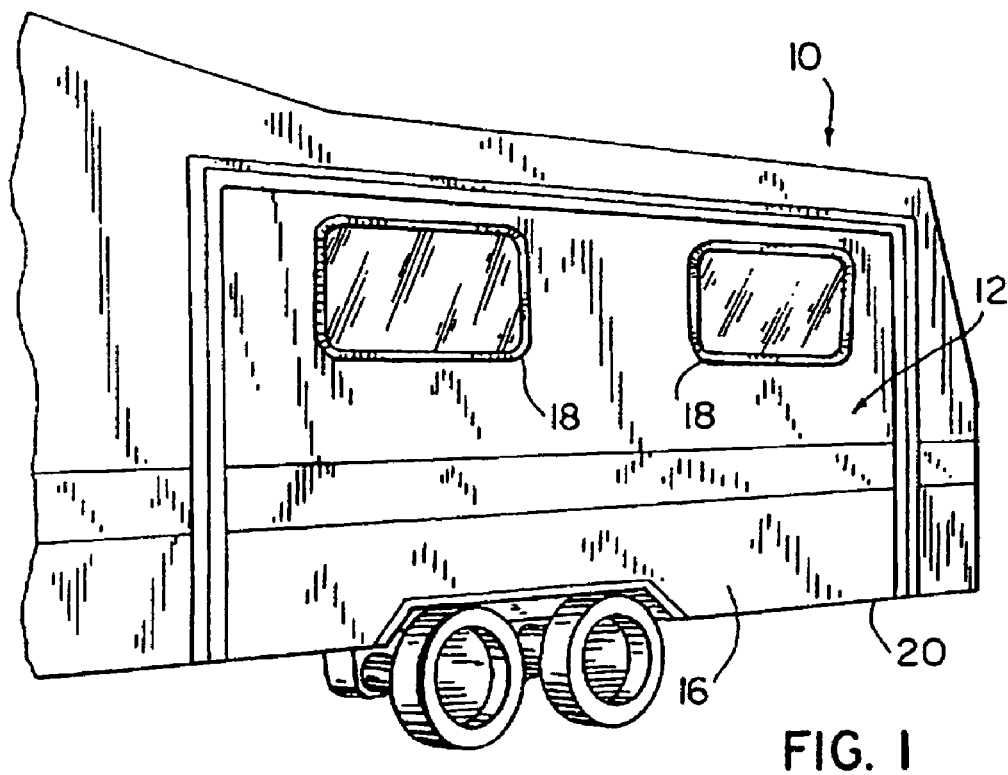
FIG. 1 is a perspective view of a slide-out room of a trailer in a retracted position.
Figure 2:
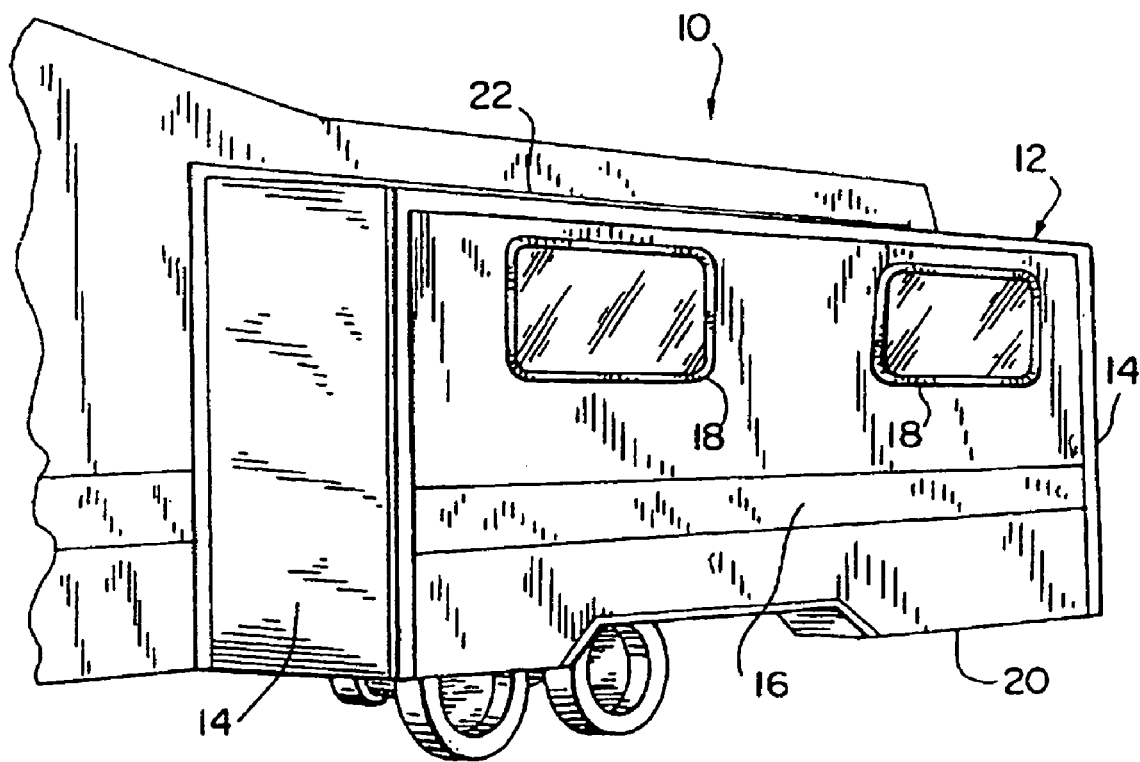
FIG. 2 is a view like FIG. 1 of the slide-out in an extended position.
Figure 3:
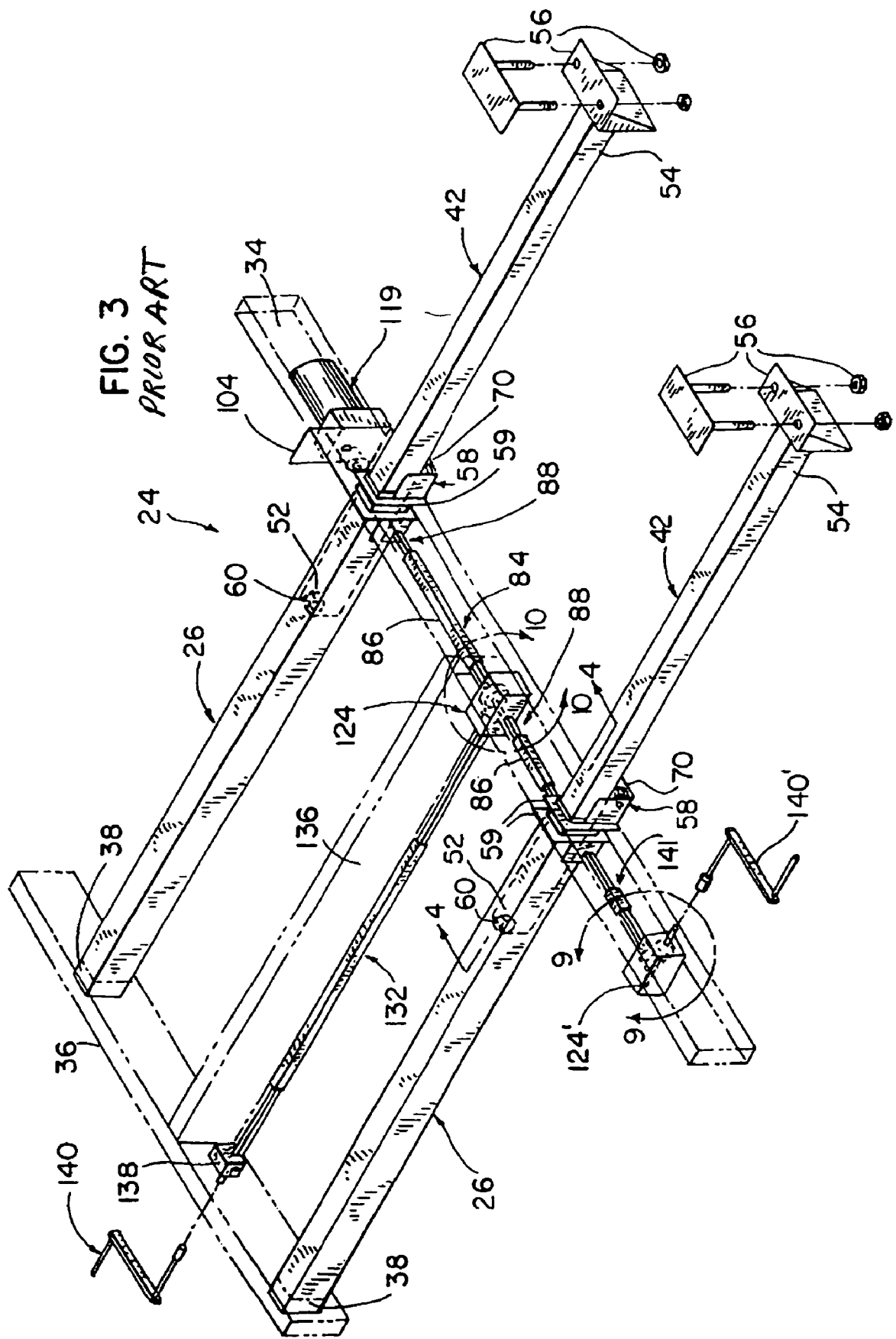
FIG. 3 is a perspective view of a prior art slide-out operating mechanism for the slide-out of FIGS. 1 and 2.

FIGS. 1-4 are described in U.S. Pat. No. 5,758,918 and the description therein respecting those figures is hereby incorporated herein by reference. FIGS. 1-3 of the current application correspond to FIGS. 1-3 of U.S. Pat. No. 5,758,918, and FIG. 4 of the current application corresponds to FIG. 14 of U.S. Pat. No. 5,758,918.

Briefly, a vehicle body 10 has mounted thereon an expandable, telescopic slide-out section 12, shown retracted in FIG. 1 and extended in FIG. 2. Slide-out section 12 is rectangularly configured and includes a pair of side walls 14, a front wall 16 with two windows 18, a bottom wall 20 and a roof 22. An arrangement for supporting and controlling the slide-out section 12 is adapted to be mounted beneath the vehicle body 10 by the mechanism illustrated in FIG. 3 or in FIG. 4.

The mechanism 24 in FIG. 3 for extending and retracting the slide-out section 12 includes a pair of substantially parallel, hollow outer rail members 26 fixed to the frame of the RV. A rail member 42 is slideably telescoped in each of the rail members 26. The outer ends of the rail members 42 are attached to the slide-out section by brackets 56 at the outer ends 54 of the rails 42. In the embodiment shown in FIGS. 3 and 4, each of the inner rails 42 has welded or otherwise secured on its bottom wall a gear rack and a pinion gear beneath each respective rail 42 is in driving engagement with the gear rack. The two pinion gears are connected by the shaft 84. In the embodiment of FIG. 3, the motor 119 drives the two pinion gears to move the rails 42 in and out. Manual drive handles 140 may also be provided. The two pinion gears rotate together because they are connected by the shaft 84, and therefore the two rails 42 are synchronized in their extension and retraction motions.

Figure 4:
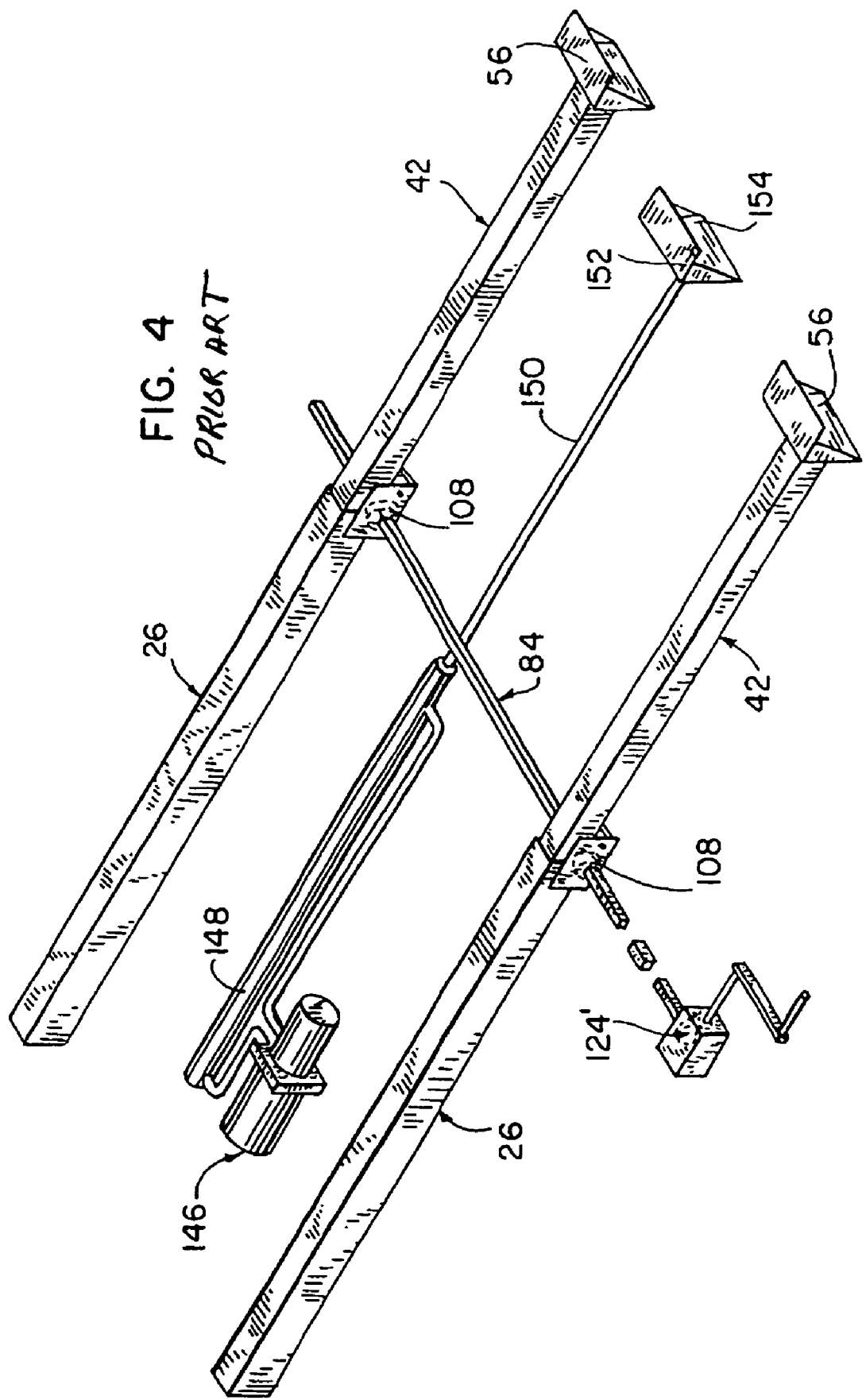
FIG. 4 is a hydraulically powered variation of the slide-out mechanism of FIG. 3, that is also prior art.

In the embodiment of FIG. 4, a hydraulic cylinder 148 and pump 146 are used to extend and retract a slide-out room, but the racks connected to the rails and the pinions connected to one another by the shaft 84 synchronize the movement of the rails 42.

The present invention provides a hydraulic solution to the synchronization of the rails 42 and eliminates the synchronizing mechanisms such as the racks, the pinions and the connecting shafts.

Figure 5:
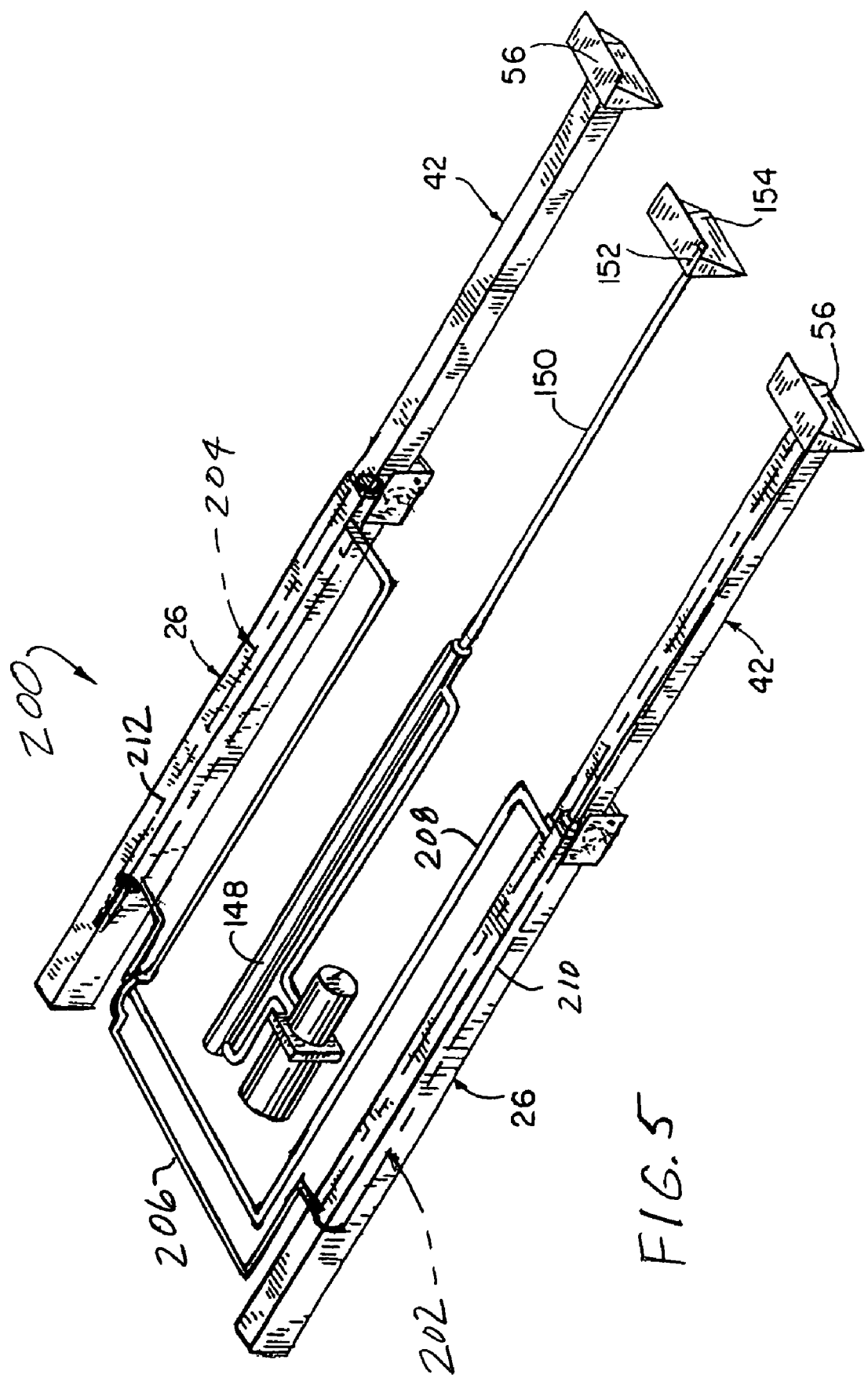
FIG. 5 is a hydraulic slide-out synchronization system of the present invention.
Figure 6:
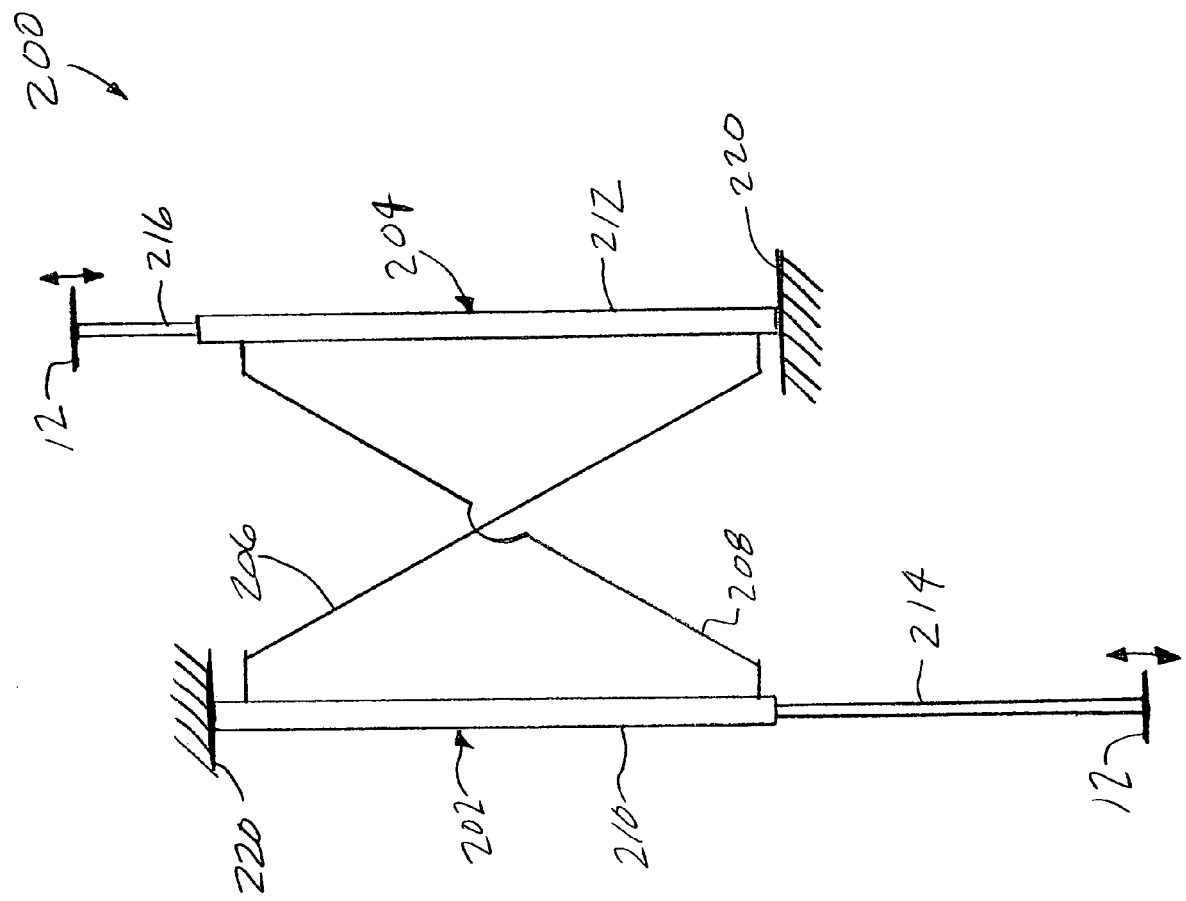
FIG. 6 is a schematic view of the hydraulic synchronization system of FIG. 5.

Referring to FIGS. 5 and 6, a system 200 of the invention includes a pair of hydraulic actuators 202, 204 having cylinders 202, 204, a first hydraulic line 206 connecting the bore sides of the two cylinders 202 and 204 and a second hydraulic line 208 connecting the rod sides of the cylinders 202 and 204. As illustrated in FIG. 5, the cylinders 202 and 204 may be incorporated inside of the hollow tubes that make up the rails 42 and 26. However, that need not be the case.

Each actuator 202, 204 includes a cylinder 210, 212 respectively and a rod, or piston rod 214, 216, respectively. The bore end (or other part) of the cylinder 210 is fixed to the frame 220 of the RV, analogous to item 34 or 36 in FIG. 3, or any other fixed member of the RV. It may be fixed to the rail 26, which is fixed to the frame of the RV. Likewise, the bore end (or other part) of cylinder 204 is fixed to the stationary frame 220 of the RV, and may be fixed to the rail 26. The rods 214 and 216, on the other hand, are secured to the slide-out, so that they move with the rails 42.

As is clear from FIGS. 5 and 6, the mounting of the cylinders 202 and 204 is reversed, such that extension of the room causes extension of one of the cylinders and retraction of the other, and retraction of the room causes retraction of the one cylinder and extension of the other. Thus, fluid is pumped back and forth between the rod side chambers of the cylinders 210 and 212 and the bore side chambers of the cylinders 210 and 212 as the room extends and retracts, which keeps the two sides of the room synchronized. This is so because the cylinders 210 and 212 are the same size, and the bore sides of both cylinders are in closed fluid communication with one another, and the rod sides of both cylinders are in closed fluid communication with one another.

Thereby, a system of the invention is completely passive, not requiring any power input to keep the two sides of the rooms synchronized as the room is moved in and out. However, power input is required to move the room, and that may be accomplished by a gear drive, a hydraulic cylinder as in FIG. 5, a screw driven mechanism, cables, a manually driven mechanism or any other type of mechanism for moving the room in and out.

Figure 7:
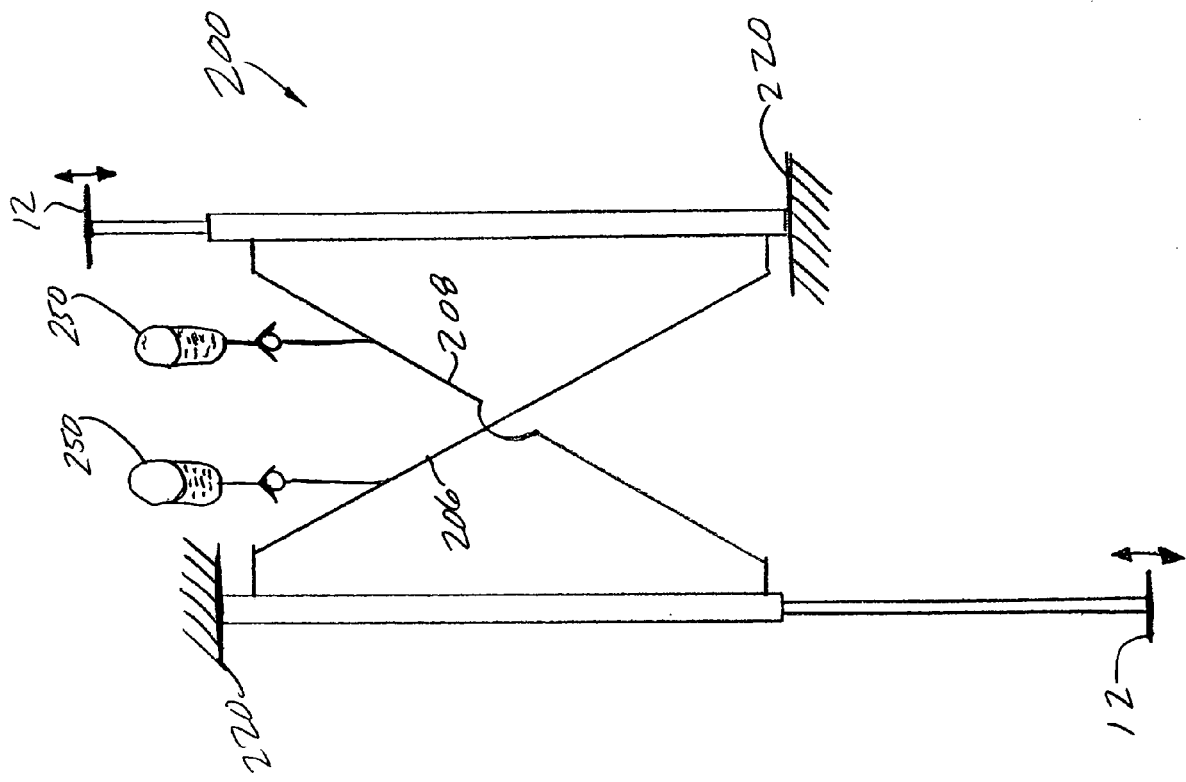
FIG. 7 is a view like FIG. 6 of a variation.

FIG. 7 discloses the embodiment of FIG. 6, with a modification to keep both hydraulic circuits full of hydraulic fluid at all times. In this modification, an accumulator 250 having a pressurized fluid chamber is in communication with each of the circuits 206 or 208 through a one way check valve, which only permits fluid to flow from the accumulator to the respective circuit 206 or 208. Thereby, if fluid leaks out of either of the circuits, it will be replenished by the accumulators 250, and reverse flow from the circuits 206 or 208 to the accumulators 250 is prevented by the check valve.

A preferred embodiment of the invention has been described in considerable detail. Many modifications and variations to the preferred embodiment described will be apparent to those skilled in the art. For example, in FIG. 6, the end of the rod 216 of actuator 204 could be stationary (fixed to RV frame or stationary rail 26) and the bore end of cylinder 212 could be attached to the movable rail 42, which would result in the cylinder 212 and hydraulic lines 206, 208 moving with the movable rail. This may be somewhat undesirable, but possibly tolerable in some applications. Therefore, the invention should not be limited to the embodiment as described, but should be defined by the claims which follow.

I claim:

1. A synchronization system for a recreational vehicle slide-out in which the recreational vehicle has a fixed portion and a slide-out portion that is moveable relative to the fixed portion of the recreational vehicle so that when the slide-out portion is extended the interior space of the recreational vehicle is increased and when the slide-out portion is retracted, the interior space is reduced, the improvement wherein the synchronization mechanism comprises at least two hydraulic cylinders, said cylinders being mounted spaced apart and mounted so that extension of the slide-out portion results in extension of one of the cylinders and retraction of the other, and retraction of the slide-out portion results in retraction of the one cylinder and extension of the other, wherein each cylinder has a rod side and a bore side, and wherein the rod sides of the cylinders are in fluid communication with one another and the bore sides of the cylinders are in fluid communication with one another.

2. The improvement of claim 1, wherein the cylinders are located within telescoping rails of the slide-out system.

\* \* \* \* \*